United States Patent Office 2,849,476
Patented Aug. 26, 1958

2,849,476

O,O-DIALKYL S-(1-DIALKYLPHOSPHONO-1-HYDROXY) ALKYL PHOSPHOROTHIOLOTHIONATES

Richard L. McConnell and Harry W. Coover, Jr., Kingsport, Tenn., assignors to Eastman Kodak Company, Rochester, N. Y., a corporation of New Jersey No Drawing. Application February 21, 1957
Serial No. 641,445

12 Claims. (Cl. 260—461)

This invention relates to new organophosphorus compounds and to a method for producing said compounds.

The compounds within the scope of this invention have the structural formula:

$$\begin{array}{c} RO \quad S \qquad OH O \quad OR_2 \\ \diagdown \| \qquad | \quad \| \diagup \\ P\!-\!S\!-\!C\!-\!P \\ \diagup \qquad | \quad \diagdown \\ RO \qquad R_1 \qquad OR_2 \end{array}$$

wherein R and $R_2$ are alkyl radicals, containing 1 to 4 carbon atoms, and $R_1$ is selected from the group consisting of phenyl, alkyl radicals containing 1 to 4 carbon atoms and chloroalkyl radicals containing 1 to 4 carbon atoms.

The compounds of this invention are prepared by reacting a dialkyl phosphorothiolothionate with a dialkyl acylphosphonate. The dialkyl phosphorothiolothionates used in practicing this invention have the structural formula:

$$\begin{array}{c} RO \quad \diagdown \quad \diagup S \\ P\!-\!SH \\ RO \diagup \end{array}$$

wherein R is an alkyl radical containing 1 to 4 carbon atoms. These compounds can be readily prepared by the reaction of phosphorus pentasulfide, $P_2S_5$, with the appropriate lower aliphatic alcohol. The dialkyl acylphosphonates that are employed in practicing this invention have the structural formula:

$$\begin{array}{c} O \quad O \quad OR_2 \\ \| \quad \| \diagup \\ R_1\!-\!C\!-\!P \\ \diagdown \\ OR_2 \end{array}$$

wherein $R_1$ and $R_2$ are as defined above. These compounds can be prepared by the reaction of an acyl halide with a trialkyl phosphite.

The reaction involved in practicing this invention can be illustrated by the following equation:

$$\begin{array}{c} RO \quad S \qquad O \quad O \quad OR_2 \qquad RO \quad S \qquad OH \quad O \quad OR_2 \\ \diagdown \| \qquad \| \quad \| \diagup \qquad \diagdown \| \qquad | \quad \| \diagup \\ P\!-\!SH + R'\!C\!-\!P \longrightarrow P\!-\!S\!-\!C\!-\!P \\ \diagup \qquad \diagdown \qquad \diagup \qquad | \quad \diagdown \\ RO \qquad OR_2 \qquad RO \qquad R_1 \qquad OR_2 \end{array}$$

wherein R, $R_1$ and $R_2$ are as described above.

The reaction for producing the new organophosphorus compounds of this invention is carried out by the portionwise addition of one of the reactants to the other reactant. Any order of addition of reactants can be used. It is preferable to use equimolar quantities of the reactants, but, if desired, an excess of either of the reactants can be used. The temperature employed for carrying out the reaction is within the range of −25 to 150° C. and the preferred temperature range is 25 to 125° C. The reaction time is usually within a range of 1 to 8 hours. The reaction can be carried out in the absence of any catalyst, but in some instances, it is found desirable to employ a base catalyst such as a tertiary amine. Similarly, solvents are not necessary for carrying out the reaction, but, if desired, inert solvents such as normally liquid hydrocarbons, chlorinated hydrocarbons and ethers can be used.

The following examples are illustrative of this invention:

EXAMPLE 1.—O,O-DIETHYL S-(1-DIETHYLPHOSPHONO-1-HYDROXY)ETHYL PHOSPHOROTHIOLOTHIONATE $$CH_3C(OH)P(O)(OC_2H_5)_2$$
$$|$$
$$SP(S)(OC_2H_5)_2$$

Diethyl acetylphosphonate (0.05 mole) and diethyl phosphorothiolothionate (0.05 mole) were mixed with stirring. The reaction is exothermic, and the temperature rose to 40° C. As the temperature started to drop, the reaction mixture was heated on the steam bath with stirring for 1 hour. The product is an amber, transparent oil, $n_D^{20}$ 1.4870.

EXAMPLE 2.—O,O-DIMETHYL S-(1-DIETHYLPHOSPHONO-1-HYDROXY)PROPYL PHOSPHOROTHIOLOTHIONATE $$CH_3CH_2C(OH)P(O)(OC_2H_5)_2$$
$$|$$
$$SP(S)(OCH_3)_2$$

This compound was prepared from diethyl propionylphosphonate (0.1 mole) and dimethyl phosphorothiolothionate (0.1 mole) according to the procedure of Example 1.

EXAMPLE 3.—O,O-DIISOPROPYL S-(1-DIPROPYLPHOSPHONO-1-HYDROXY)ISOBUTYL PHOSPHOROTHIOLOTHIONATE $$(CH_3)_2CHC(OH)P(O)(OC_3H_7)_2$$
$$|$$
$$SP(S)[OCH(CH_3)_2]_2$$

This compound was prepared from dipropyl isobutyrylphosphonate (0.1 mole) and diisopropyl phosphorothiolothionate (0.1 mole) according to the procedure of Example 1.

EXAMPLE 4.—O,O-DIETHYL S-(1-DIETHYLPHOSPHONO-1-HYDROXY)BENZYL PHOSPHOROTHIOLOTHIONATE $$C_6H_5C(OH)P(O)(OC_2H_5)_2$$
$$|$$
$$SP(S)(OC_2H_5)_2$$

This compound was prepared from diethyl benzoylphosphonate (0.1 mole) and diethyl phosphorothiolothionate (0.1 mole) according to the procedure of Example 1.

EXAMPLE 5.—O,O-DIETHYL S-(1-DIETHYLPHOSPHONO-1-HYDROXYBUTYL) PHOSPHOROTHIONATE $$CH_3CH_2CH_2C(OH)P(O)(OC_2H_5)_2$$
$$|$$
$$SP(S)(OC_2H_5)_2$$

This compound was prepared from diethyl butyrylphosphonate (0.1 mole) and diethyl phosphorothiolothionate (0.1 mole) according to the procedure of Example 1.

EXAMPLE 6.—O,O-DIETHYL S-(2-CHLORO-1-DIETHYLPHOSPHONO-1-HYDROXY)ETHYL PHOSPHOROTHIOLOTHIONATE $$\begin{array}{c} OH \\ | \\ ClCH_2C\!-\!P(O)(OC_2H_5)_2 \\ | \\ SP(S)(OC_2H_5)_2 \end{array}$$

This compound was prepared from diethyl chloroacetyl phosphonate (0.1 mole) and diethyl phosphorothiolothionate (0.1 mole) according to the procedure of Example 1.

EXAMPLE 7.—INSECTICIDAL ACTIVITY

Tests against 2-spotted mites were carried out in the following manner. Acetone solutions containing 1% of the candidate compounds were prepared and diluted with water to give solutions containing the desired concentration of the candidate compounds for testing. Two heavily infested bean leaves containing adult 2-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites. Similar tests were carried out against the cowpea aphid (*Aphis medicaginis* Koch).

It should be noted that tests using acetone-water solutions (containing none of the toxicant) kill neither mites nor aphids. This is the blank run referred to in Table 1.

*Table 1*

TOXICANT: O,O-DIETHYL S-(1-DIETHYLPHOSPHONO-1-HYDROXY)ETHYL PHOSPHOROTHIOLOTHIONATE (EXAMPLE 1)

| Concentration in p. p. m. | Percent kill mites | Percent kill aphids |
|---|---|---|
| 0 (blank) | 0 | 0 |
| 100 | 94 | 97 |
| 30 | | 100 |

The products of Examples 2 through 6 were also effective against mites and aphids when tested in the above-described manner.

We claim:
1. As a composition of matter an organophosphorus compound having the structural formula:

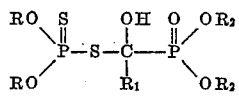

wherein R and $R_2$ are alkyl radicals, containing 1 to 4 carbon atoms, and $R_1$ is selected from the group consisting of phenyl, alkyl radicals containing 1 to 4 carbon atoms and chloroalkyl radicals containing 1 to 4 carbon atoms.

2. As a composition of matter O,O-diethyl S-(1-diethylphosphono-1-hydroxy)ethyl phosphorothiolothionate having the formula:

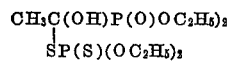

3. As a composition of matter O,O-dimethyl S-(1-diethylphosphono-1-hydroxy)propyl phosphorothiolothionate having the formula:

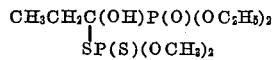

4. As a composition of matter O,O-diisopropyl S-(1-dipropylphosphono-1-hydroxy)isobutyl phosphorothiolothionate having the formula:

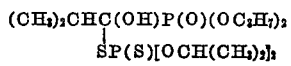

5. As a composition of matter O,O-diethyl S-(1-diethylphosphono-1-hydroxy)benzyl phosphorothiolothionate having the formula:

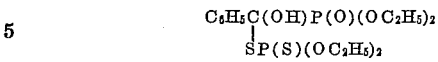

6. As a composition of matter O,O-diethyl S-(2-chloro-1-diethylphosphono-1-hydroxy)ethyl phosphorothiolothionate having the formula:

7. The method for producing organophosphorus compounds which comprises reacting a dialkyl phosphorothiolothionate having the structural formula:

wherein R is an alkyl radical containing 1 to 4 carbon atoms with a dialkyl acylphosphonate having the structural formula:

wherein $R_1$ is selected from the group consisting of phenyl, alkyl radicals containing 1 to 4 carbon atoms and chloroalkyl radicals containing 1 to 4 carbon atoms and $R_2$ is an alkyl radical containing 1 to 4 carbon atoms at a temperature within the range of −25 to 150° C.

8. The method for producing O,O-diethyl S-(1-diethylphosphono-1-hydroxy)ethyl phosphorothiolothionate which comprises reacting diethyl acetylphosphonate with diethyl phosphorothiolothionate at a temperature within the range of −25 to 150° C.

9. The method for producing O,O-dimethyl S-(1-diethylphosphono-1-hydroxy)propyl phosphorothiolothionate which comprises reacting diethyl propionylphosphate with dimethyl phosphorothiolothionate at a temperature within the range of −25 to 150° C.

10. The method for producing O,O-diisopropyl S-(1-dipropylphosphono-1-hydroxy)isobutyl phosphorothiolothionate which comprises reacting dipropyl isobutyrylphosphonate with diisopropyl phosphorothiolothionate at a temperature within the range of −25 to 150° C.

11. The method for producing O,O-diethyl S-(1-diethylphosphono-1-hydroxy)benzyl phosphorothiolothionate which comprises reacting diethyl benzoylphosphonate with diethyl phosphorothiolothionate at a temperature within the range of −25 to 150° C.

12. The method for producing O,O-diethyl S-(2-chloro-1-diethylphosphono-1-hydroxy)ethyl phosphorothiolothionate which cmoprises reacting diethyl chloroacetyl phosphonate with diethyl phosphorothiolothionate at a temperature within the range of −25 to 150° C.

No references cited.